US012715503B2

(12) United States Patent
Okada et al.

(10) Patent No.: US 12,715,503 B2
(45) Date of Patent: Aug. 25, 2026

(54) STEERING CONTROL DEVICE

(71) Applicants: JTEKT CORPORATION, Kariya (JP); TOYOTA JIDOSHA KABUSHIKI KAISHA, Toyota (JP)

(72) Inventors: Kotaro Okada, Kashiba (JP); Kazuki Itazuri, Toyota (JP)

(73) Assignees: JTEKT CORPORATION, Aichi-ken (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 381 days.

(21) Appl. No.: 18/508,665

(22) Filed: Nov. 14, 2023

(65) Prior Publication Data

US 2024/0158003 A1 May 16, 2024

(30) Foreign Application Priority Data

Nov. 16, 2022 (JP) ................................ 2022-183600

(51) Int. Cl.
*B62D 6/00* (2006.01)
*B60W 30/12* (2020.01)
*B62D 5/00* (2006.01)
*B62D 5/04* (2006.01)

(52) U.S. Cl.
CPC ............... *B62D 6/00* (2013.01); *B60W 30/12* (2013.01); *B62D 5/001* (2013.01); *B62D 5/046* (2013.01)

(58) Field of Classification Search
CPC .......... B62D 6/00; B62D 5/046; B62D 5/001; B62D 6/008; B60W 30/12; B60W 30/10; B60W 30/18145
See application file for complete search history.

(56) References Cited

U.S. PATENT DOCUMENTS

2020/0307685 A1* 10/2020 Akiyama ............. G05D 1/0246

FOREIGN PATENT DOCUMENTS

| | | |
|---|---|---|
| JP | 2021-017209 A | 2/2021 |
| JP | 2022-068056 A | 5/2022 |
| WO | 2022/128103 A1 | 6/2022 |

OTHER PUBLICATIONS

May 13, 2024 Search Report issued in European Patent Application No. 23210109.7.

May 8, 2026 Office Action issued in Japanese Patent Application No. 2022-183600.

* cited by examiner

*Primary Examiner* — Jacob M Amick
(74) *Attorney, Agent, or Firm* — Oliff PLC

(57) ABSTRACT

A steering control device includes a processor. The processor is configured to execute a target rudder angle correction process, a restriction process, and a rudder angle control process. The target rudder angle correction process is a process of correcting the value of the target rudder angle variable by a play compensation amount corresponding to a steering direction. The restriction process is a process of restricting the magnitude of the play compensation amount to a small side depending on the traveling route at a current position of the vehicle and the traveling route at a movement-directional forward position. The rudder angle control process is a process of operating the motor by a control in which a steering angle is adopted as a control amount and the value of the target rudder angle variable is adopted as a target value of the control amount.

9 Claims, 7 Drawing Sheets

10
12
14
16
18
20
22
24
26
28
30
32
40 (R)
40 (L)
50
52
iu, iv, iw
θm
60
62
PU
64
STORAGE DEVICE
70
72
80
HIGHER-LEVEL ECU
82
CAMERA
84
V
VEHICLE SPEED SENSOR
86
INTERFACE

FIG. 6 f (αR0) =g (K1・K2・αR0)

| | |
|---|---|
| K1・K2・αR0 | SMALL ⟷ αRth ⟷ LARGE |
| g (K1・K2・αR0) | ⟵ K1・K2・αR0 ⟶ αRth ⟷ αRth |

| | |
|---|---|
| R (t) | SMALL ⟷ LARGE |
| K1 | SMALL ⟷ 1 |

| | |
|---|---|
| ΔR | SMALL ⟵ 0 ⟶ LARGE |
| K2 | SMALL ⟷ 1 ⟷ 1 |

FIG. 7

| | |
|---|---|
| ΔR | SMALL ⟵ 0 ⟶ LARGE |
| g (αR0) | SMALL ⟷ αR0 ⟷ αR0 |

STEERING CONTROL DEVICE

CROSS-REFERENCE TO RELATED APPLICATION

This application claims priority to Japanese Patent Application No. 2022-183600 filed on Nov. 16, 2022, incorporated herein by reference in its entirety.

BACKGROUND

1. Technical Field

The present disclosure relates to a steering control device.

2. Description of Related Art

For example, Japanese Unexamined Patent Application Publication No. 2022-68056 describes a control device that corrects a target steering angle depending on a steering direction. In this device, when a planned steering direction is a right steering direction, the target steering angle is corrected by a play amount that is a value corresponding to the right steering direction. The play amount is the maximum of an amount in which a turning angle of a turning wheel does not change even when a steering angle changes.

SUMMARY

In the case where the target steering angle is corrected depending on the steering direction as described above, there is fear that inconvenience occurs, when the curvature radius of a lane at a forward position in the movement direction of a vehicle is small. For example, in the case where the lane turns left immediately after the target steering angle is corrected by the play amount that is a value corresponding to the right steering direction, there is fear that the trackability to the lane decreases. Further, for example, in the case where the lane turns left immediately after the target steering angle is corrected by the play amount that is a value corresponding to the right steering direction, the displacement amount of a steering wheel becomes large, and there is fear that a driver has a feeling of strangeness.

A steering control device in an aspect of the present disclosure is configured to control a steering device. The steering device includes a steering shaft, a turning wheel of a vehicle, the turning wheel being configured to turn along with rotation of the steering shaft, and a motor configured to rotate the steering shaft. The steering control device includes a processor. The processor is configured to execute a target rudder angle variable acquisition process, a traveling route information acquisition process, a target rudder angle correction process, a restriction process, and a rudder angle control process. The target rudder angle variable acquisition process is a process of acquiring the value of a target rudder angle variable. The target rudder angle variable is a variable that indicates a target value of a turning angle of the turning wheel. The traveling route information acquisition process is a process of acquiring information about a traveling route of the vehicle. The target rudder angle correction process is a process of correcting the value of the target rudder angle variable by a play compensation amount corresponding to a steering direction. The steering direction is a direction in which the value of the target rudder angle variable changes. The restriction process is a process of restricting a magnitude of the play compensation amount to a small side depending on the traveling route at a current position of the vehicle and the traveling route at a movement-directional forward position. The rudder angle control process is a process of operating the motor by a control in which a steering angle depending on a rotation angle of the steering shaft is adopted as a control amount and the value of the target rudder angle variable is adopted as a target value of the control amount.

Even when the steering shaft is rotated in response to the change in the steering direction, there is a play region where the turning angle does not change even when the rotation of the steering shaft changes. Hence, in the above configuration, the value of the target rudder angle variable is corrected by the play compensation amount corresponding to the steering direction. Thereby, it is possible to improve the trackability of the turning angle to the value of the target rudder angle variable.

However, for example, in the case where the turn direction is different between the traveling route at the current position and the traveling route at the movement-directional forward position, when the correction amount based on the play compensation amount is large, there can be inconvenience such as the decrease in the trackability to the lane at the time of the arrival at the traveling route at the movement-directional forward position. Hence, in the above configuration, the magnitude of the play compensation amount is restricted to the small side, depending on the traveling route at the current position and the traveling route at the movement-directional forward position. Thereby, it is possible to restrain the inconvenience from being caused by the large magnitude of the play compensation amount.

In the steering control device according to the aspect of the present disclosure, the restriction process may include a process of restricting, on a forward turn route, the magnitude of the play compensation amount corresponding to the steering direction that is an opposite direction of a turn direction at the movement-directional forward position, to a smaller value, compared to when both of a curvature radius of the traveling route at the current position and a curvature radius of the traveling route at the movement-directional forward position are equal to or larger than a straight-movement threshold. The forward turn route may be a route on which the curvature radius of the traveling route at the current position is equal to or larger than the straight-movement threshold and the curvature radius of the traveling route at the movement-directional forward position is smaller than the straight-movement threshold.

When the curvature radius of the traveling route at the current position is equal to or larger than the straight-movement threshold, it is less necessary to quickly change the movement direction of the vehicle, compared to when the curvature radius of the traveling route at the current position is smaller than the straight-movement threshold. On the other hand, when the curvature radius of the traveling route at the movement-directional forward position is smaller than the straight-movement threshold, it is more necessary to quickly change the movement direction of the vehicle at the movement-directional forward position, compared to when the curvature radius of the traveling route at the movement-directional forward position is equal to or larger than the straight-movement threshold. Therefore, in the case where the value of the target rudder angle variable is corrected by the play compensation amount corresponding to the steering direction that is the opposite direction of the turn direction at the movement-directional forward position, there is fear that inconvenience occurs in the steering after the correction, when the magnitude of the play compensation amount is large. However, in the above configuration, it is possible to restrain the occurrence of the inconvenience, by restricting the magnitude of the play compensation amount to the small value.

In the steering control device according to the aspect of the present disclosure, the restriction process may include a process of altering, on the forward turn route, the magnitude of the play compensation amount corresponding to the steering direction that is the opposite direction of the turn direction at the movement-directional forward position, depending on the curvature radius of the traveling route at the movement-directional forward position, and setting the magnitude of the play compensation amount when the curvature radius of the traveling route at the movement-directional forward position is small, to equal to or smaller than the magnitude of the play compensation amount when the curvature radius of the traveling route at the movement-directional forward position is large.

When the curvature radius is small, it is more necessary to quickly change the movement direction of the vehicle, compared to when the curvature radius is large. Hence, in the above configuration, the magnitude of the play compensation amount is altered depending on the curvature radius, such that the magnitude of the play compensation amount when the curvature radius of the traveling route at the movement-directional forward position is small is equal to or smaller than the magnitude of the play compensation amount when the curvature radius of the traveling route at the movement-directional forward position is large. Therefore, in the above configuration, even when the curvature radius is small, it is easy to track the curvature radius.

In the steering control device according to the aspect of the present disclosure, the restriction process may include a process of altering, on the forward turn route, the magnitude of the play compensation amount corresponding to the steering direction that is the opposite direction of the turn direction at the movement-directional forward position, depending on a decrease rate of the curvature radius of the traveling route at the movement-directional forward position, and setting the magnitude of the play compensation amount when the decrease rate is large to equal to or smaller than the magnitude of the play compensation amount when the decrease rate is small.

When the decrease rate of the curvature radius of the traveling route at the movement-directional forward position is large, it is more necessary to quickly change the movement direction of the vehicle, compared to when the decrease rate is small. Hence, in the above configuration, the magnitude of the play compensation amount is altered depending on the decrease rate of the curvature radius, such that the magnitude of the play compensation amount when the decrease rate of the curvature radius of the traveling route at the movement-directional forward position is small is equal to or smaller than the magnitude of the play compensation amount when the decrease rate of the curvature radius of the traveling route at the movement-directional forward position is large. Therefore, in the above configuration, even when the decrease rate of the curvature radius is large, it is easy to track the decrease rate.

In the steering control device according to the aspect of the present disclosure, the processor may be configured to execute the rudder angle control process in an automatic steering mode. The processor may be configured to execute a play displacement calculation process and a base amount setting process. The play displacement calculation process may be a process of calculating a play displacement each time the steering angle changes. The play displacement may be an amount that identifies a position in a region where the turning angle does not change even when the steering angle changes. The base amount setting process may be a process of setting a play base amount corresponding to a right steering direction and a play base amount corresponding to a left steering direction, to quantities that allow the steering angle to be maintained within the region, depending on the play displacement at a time when the automatic steering mode is achieved. The restriction process may include a process of restricting, on the forward turn route, the magnitude of the play compensation amount corresponding to the steering direction that is the opposite direction of the turn direction at the movement-directional forward position, to a smaller value than a magnitude of the play base amount, when the magnitude of the play base amount is equal to or larger than a predetermined value.

Even when the value of the target rudder angle variable is corrected by the play compensation amount having the magnitude of the play base amount, the turning angle of the turning wheel does not change due to the play compensation amount. However, when the play compensation amount having the magnitude of the play base amount is employed, on the forward turn route, there is fear that inconvenience occurs on the turn route at the movement-directional forward position. Hence, in the above configuration, the magnitude of the play compensation amount is set to smaller than the magnitude of the play base amount. Thereby, it is possible to restrain the inconvenience from occurring on the turn route at the forward position.

In the steering control device according to the aspect of the present disclosure, the restriction process may include a process of restricting, on a continuous turn route, the magnitude of the play compensation amount corresponding to the steering direction that is an opposite direction of a turn direction at the movement-directional forward position, to a smaller value, compared to when both of the curvature radius of the traveling route at the current position and the curvature radius of the traveling route at the movement-directional forward position are equal to or larger than a straight-movement threshold, the continuous turn route being a route on which the curvature radius of the traveling route at the current position is smaller than the straight-movement threshold and the curvature radius of the traveling route at the movement-directional forward position is smaller than the straight-movement threshold.

When the steering is performed in the opposite direction of the lane even though the traveling route is continuously curved in one direction, it is likely to be less necessary to quickly change the movement direction of the vehicle. Hence, in the above configuration, the magnitude of the play compensation amount corresponding to the steering direction that is the opposite direction of the turn direction of the lane on the continuous turn route is restricted to the smaller value. Thereby, it is possible to restrain the traveling along the lane from becoming difficult.

In the steering control device according to the aspect of the present disclosure, the restriction process may include a process of cancelling the restriction to the smaller value when a time during which steering in the opposite direction of the turn direction at the movement-directional forward position is continued is equal to or longer than a predetermined time.

When the steering in the opposite direction is continued, the demand for the steering in the opposite direction is likely to be large. Hence, in the above configuration, in such a situation, the process of restricting the magnitude of the play compensation amount to the smaller value is cancelled. Thereby, it is possible to sufficiently meet the steering demand.

In the steering control device according to the aspect of the present disclosure, the process of restricting, on the continuous turn route, the magnitude of the play compensation amount corresponding to the steering direction that is the opposite direction of the turn direction at the movement-directional forward position, to the smaller value, compared to when both of the curvature radius of the traveling route at the current position and the curvature radius of the traveling route at the movement-directional forward position are equal to or larger than the straight-movement threshold may be a process that is executed when a turn direction of the traveling route at the current position and the turn direction of the traveling route at the movement-directional forward position are the same. The restriction process may include a process of restricting, on the continuous turn route, the magnitude of the play compensation amount corresponding to the steering direction that is the opposite direction of the turn direction at the movement-directional forward position, to a smaller side, when the turn direction of the traveling route at the current position and the turn direction of the traveling route at the movement-directional forward position are the same, compared to when the turn direction of the traveling route at the current position and the turn direction of the traveling route at the movement-directional forward position are different.

When the turn direction at the current position and the turn direction at the movement-directional forward position are the same, it is less necessary to quickly change the movement direction of the vehicle to the opposite side of the turn direction at the movement-directional forward position. On the other hand, when the turn direction at the current position and the turn direction at the movement-directional forward position are opposite directions, it is more necessary to quickly change the movement direction of the vehicle to the opposite side of the turn direction at the movement-directional forward position, because it is necessary to track the traveling route at the current position. Therefore, in the above configuration, the magnitude of the play compensation amount when the turn direction at the current position and the turn direction at the movement-directional forward position are the same is reduced. Thereby, when the turn direction at the current position and the turn direction at the movement-directional forward position are opposite directions, it is easy to travel so as to sufficiently track the traveling route at the current position.

In the steering control device according to the aspect of the present disclosure, the restriction process may include a process of altering, on the continuous turn route, the magnitude of the play compensation amount corresponding to the steering direction that is the opposite direction of the turn direction at the movement-directional forward position, depending on the decrease rate of the curvature radius of the traveling route at the movement-directional forward position, and setting the magnitude of the play compensation amount when the decrease rate is large to equal to or smaller than the magnitude of the play compensation amount when the decrease rate is small.

When the decrease rate of the curvature radius of the traveling route is large, the demand for the quick change in the movement direction of the vehicle is larger compared to when the decrease rate is small. Therefore, in the above configuration, it is possible to enhance the trackability to the traveling route, by reducing the restriction of the magnitude of the play compensation amount when the decrease rate is large.

In the steering control device according to the aspect of the present disclosure, the processor may be configured to execute the rudder angle control process in an automatic steering mode. The processor may be configured to execute a play displacement calculation process and a base amount setting process. The play displacement calculation process may be a process of calculating a play displacement each time the steering angle changes. The play displacement may be an amount that identifies a position in a region where the turning angle does not change even when the steering angle changes. The base amount setting process may be a process of setting a play base amount corresponding to a right steering direction and a play base amount corresponding to a left steering direction, to quantities that allow the steering angle to be maintained within the region, depending on the play displacement at a time when the automatic steering mode is achieved. The restriction process may be a process of restricting the play compensation amount to a smaller value than the play base amounts.

Even when the value of the target rudder angle variable is corrected by the play compensation amount having the magnitude of the play base amount when the steering direction changes, the play compensation amount does not change the turning angle of the turning wheel. However, for example, in the case where there is no consistency with the turn direction at the movement-directional forward position, there is fear that inconvenience occurs on the traveling route at the movement-directional forward position, when the play compensation amount having the magnitude of the play base amount is employed. Hence, in the above configuration, the magnitude of the play compensation amount is caused to be smaller than the magnitude of the play base amount. Thereby, it is possible to restrain the inconvenience from occurring on the traveling route at the forward position.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 6 is a diagram exemplifying the restriction of a play compensation amount according to the first embodiment;

FIG. 7 is a diagram exemplifying the restriction of the play compensation amount according to the first embodiment.

DETAILED DESCRIPTION OF EMBODIMENTS

First Embodiment

A first embodiment will be described below with reference to the drawings.

Base Configuration

Figure 1:
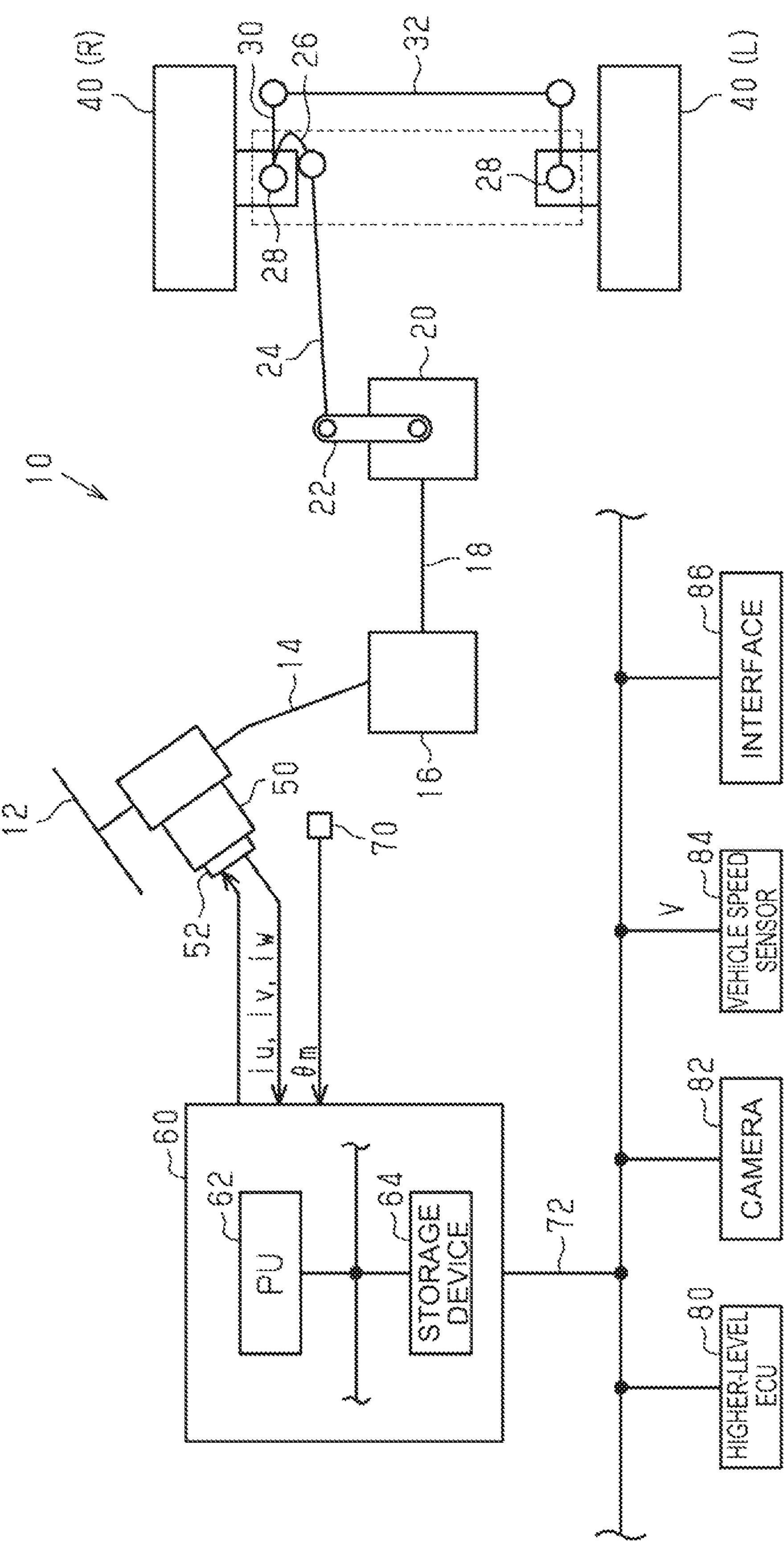
FIG. 1 is a block diagram showing the configuration of a steering system according to a first embodiment.

A steering device 10 shown in FIG. 1 includes a steering wheel 12. A steering shaft 14 is coupled to the steering wheel 12. An end portion of the steering shaft 14 on the opposite side of the steering wheel 12 is coupled to an input shaft of the bevel gear unit 16. An output shaft of the bevel gear unit 16 is coupled to an input shaft of a hydraulic power steering device 20 through a dynamic power transmission shaft 18. A sector shaft of the hydraulic power steering device 20 is coupled to one end portion of a pitman arm 22. The other end portion of the pitman arm 22 is coupled to one end portion of a drag link 24. The other end portion of the drag link 24 is coupled to one end portion of a knuckle arm 26. The other end portion of the knuckle arm 26 is coupled to a kingpin shaft 28 of a right turning wheel 40(R). The kingpin shaft 28 of the right turning wheel 40(R) and a kingpin shaft 28 of a left turning wheel 40(L) are coupled by a tie rod arm 30 and a tie rod 32.

The rotation power of the motor 50 is transmitted to the steering shaft 14. As an example, the motor 50 is a synchronous electric motor. The output voltage of an inverter 52 is applied to a terminal of the motor 50.

A steering control device 60 controls the steering device 10 as a control object. For the control of the control object, the steering control device 60 refers to a rotation angle θm of the motor 50 that is detected by a rotation angle sensor 70. Further, the steering control device 60 refers to electric currents iu, iv, iw that flow through respective terminals of the motor 50. For example, the electric currents iu, iv, iw may be detected as voltage drop amounts by shunt resistances provided on respective legs of the inverter 52. The steering control device 60 refers to a vehicle speed V detected by a vehicle speed sensor 84, through a network 72.

The steering control device 60 can communicate with a higher-level ECU 80 through the network 72. The higher-level ECU 80 executes a process of generating a command for intervening in the steering of a vehicle, independently of the instruction of the steering by the operation of the steering wheel 12. In other words, the higher-level ECU 80 executes an automatic steering process. For executing the automatic steering process, the higher-level ECU 80 acquires image data about the forward view of the vehicle that is photographed by a camera 82. Further, the higher-level ECU 80 knows an intention that is input by a driver and that indicates whether the automatic steering process is executed, and the like, through an interface 86.

The steering control device 60 includes a PU 62 and a storage device 64. The PU 62 is a software processing device such as a CPU, a GPU, and a TPU. The storage device 64 may be an electrically non-rewritable non-volatile memory. Further, the storage device 64 may be an electrically rewritable non-volatile memory or a storage medium such as a disk medium. The PU 62 executes a program stored in the storage device 64, so that the steering control device 60 executes the process of controlling the control object.

Characteristic of Steering Device 10

The above-described steering device 10 has a complex link structure, and therefore a so-called play in which the turning wheel 40 does not rotate despite the rotation of the steering shaft 14 is large.

Figure 2:
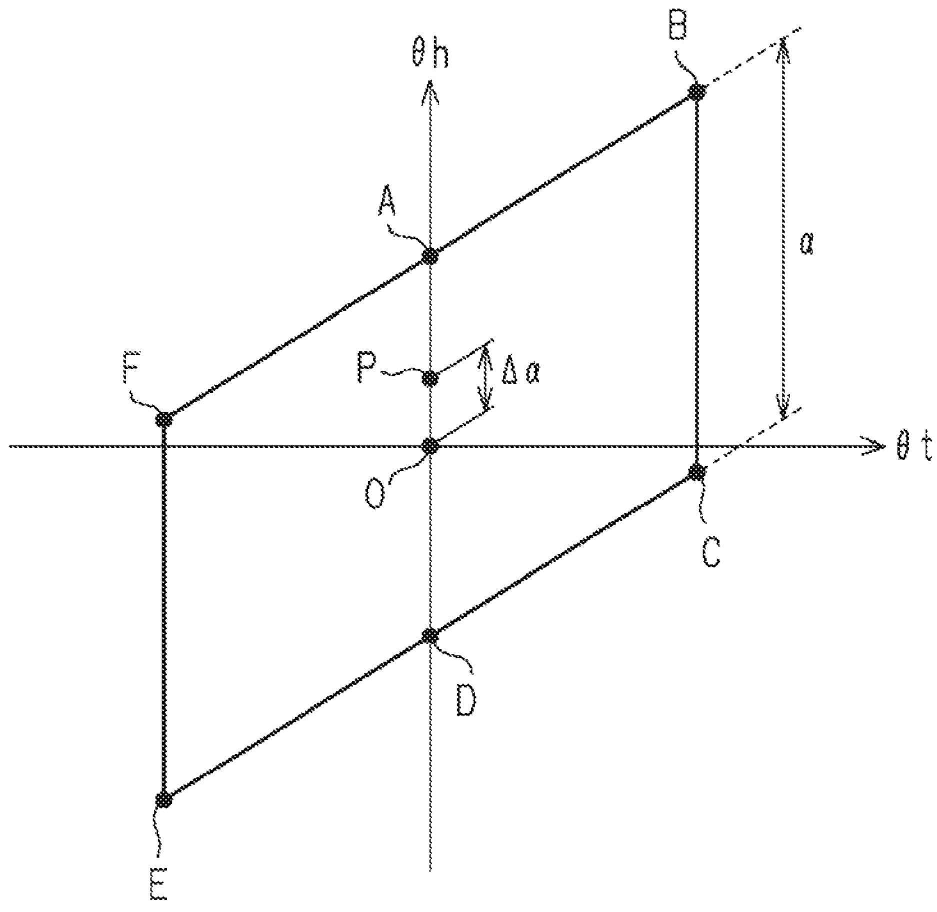
FIG. 2 is a diagram showing the relation between a steering angle and a turning angle according to the first embodiment.

FIG. 2 shows the relation between a steering angle θh and a turning angle θt. The steering angle θh is the rotation angle of the steering shaft 14. On the other hand, the turning angle θt is the moving angle of a tire for the turning wheel 40. Further, a neutral position O described in FIG. 2 is a point where both of the steering angle θh and the turning angle θt are zero. This means that both of the steering angle θh and the turning angle θt indicate a straight-movement direction. Hereinafter, the rotation angle in the right turn direction is a positive angle, and the rotation angle in the left turn direction is a negative angle.

As shown in FIG. 2, even when the steering angle θh is changed from the neutral position O in the right turn direction, the turning angle θt does not change until the steering angle θh reaches a point A. Then, when the steering angle θh becomes a further large value than the point A, the turning angle θt increases.

Further, even when the steering angle θh is decreased at a point B, the turning angle θt does not change. In other words, even when the steering direction is switched to the left side at the point B, the turning angle θt does not change. The steering direction is a direction that is indicated by the rotation speed of the steering shaft 14. Then, when the steering angle θh becomes a further small value beyond a point C, the turning angle θt decreases. In other hands, the steering angle θh is a negative value, and the absolute value of the steering angle θh is further increased beyond the point C, the turning angle θt decreases.

Then, at a point D where the turning angle θt becomes zero, the steering angle θh becomes a negative value. A point E is a value that is obtained by further displacing the steering angle θh in the left steering direction after the turning angle θt becomes zero. Even when the steering angle θh is increased at the point E, the turning angle θt does not change until the steering angle θh reaches a point F. When the steering angle θh becomes further large beyond the point F, the turning angle θt increases.

In this way, for example, in the case of the position of the point B, the turning angle θt does not change even when the steering angle θh changes between the point B and the point C. Further, for example, in the case of the position of the point E, the turning angle θt does not change even when the steering angle θh changes between the point E and the point F. In this way, due to the play of the steering device 10, there is a region where the turning angle θt does not change despite the change in the steering angle θh. This region is not a region that includes fixed values of the steering angle θh but a region that can be changed by a history of the change in the steering angle θh.

The displacement of the steering angle θh from the point B to the point C occurs at the time of the switching-back from the right turn. Further, the displacement of the steering angle θh from the point E to the point F occurs at the time of the switching-back from the left turn. The length of the region where the turning angle θt does not change despite the change in the steering angle θh at the time of the switching-back is described as "a" in FIG. 2. Further, "a" is previously stored in the storage device 64. For example, "a" may be a fixed value. Further, for example, "a" may be a value that is often updated. For example, the update process for "a" can be executed as follows.

1. The PU 62 rotates the steering shaft 14 by controlling the rotation angle of the motor 50 at the time of the stop of the vehicle.
2. The PU 62 identifies an end portion of the above region by the rotation angle of the motor 50 immediately before the electric current flowing through the motor 50 by the rotation of the motor 50 exceeds a threshold.

The PU 62 estimates "a" by performing the control of the rotation angle of the motor 50 described in "1" and "2" for both of right rotation and left rotation. The PU 62 updates the "$\alpha$" stored in the storage device 64, by the estimated "$\alpha$". For example, the PU 62 may store the estimated "$\alpha$" in the storage device 64. Further, for example, in the storage device 64, the PU 62 may newly store a value resulting from weighted average processing between the estimated "$\alpha$" and the "$\alpha$" stored in the storage device 64.

Setting of Play Base Amount

The above region causes the decrease in the responsiveness of the change in the turning angle $\theta t$ with respect to the change in the steering angle $\theta h$. Therefore, in the embodiment, the decrease in the responsiveness is restrained by a play compensation amount. First, the setting of a play base amount that is a base amount for calculating the play compensation amount will be described.

Figure 3:
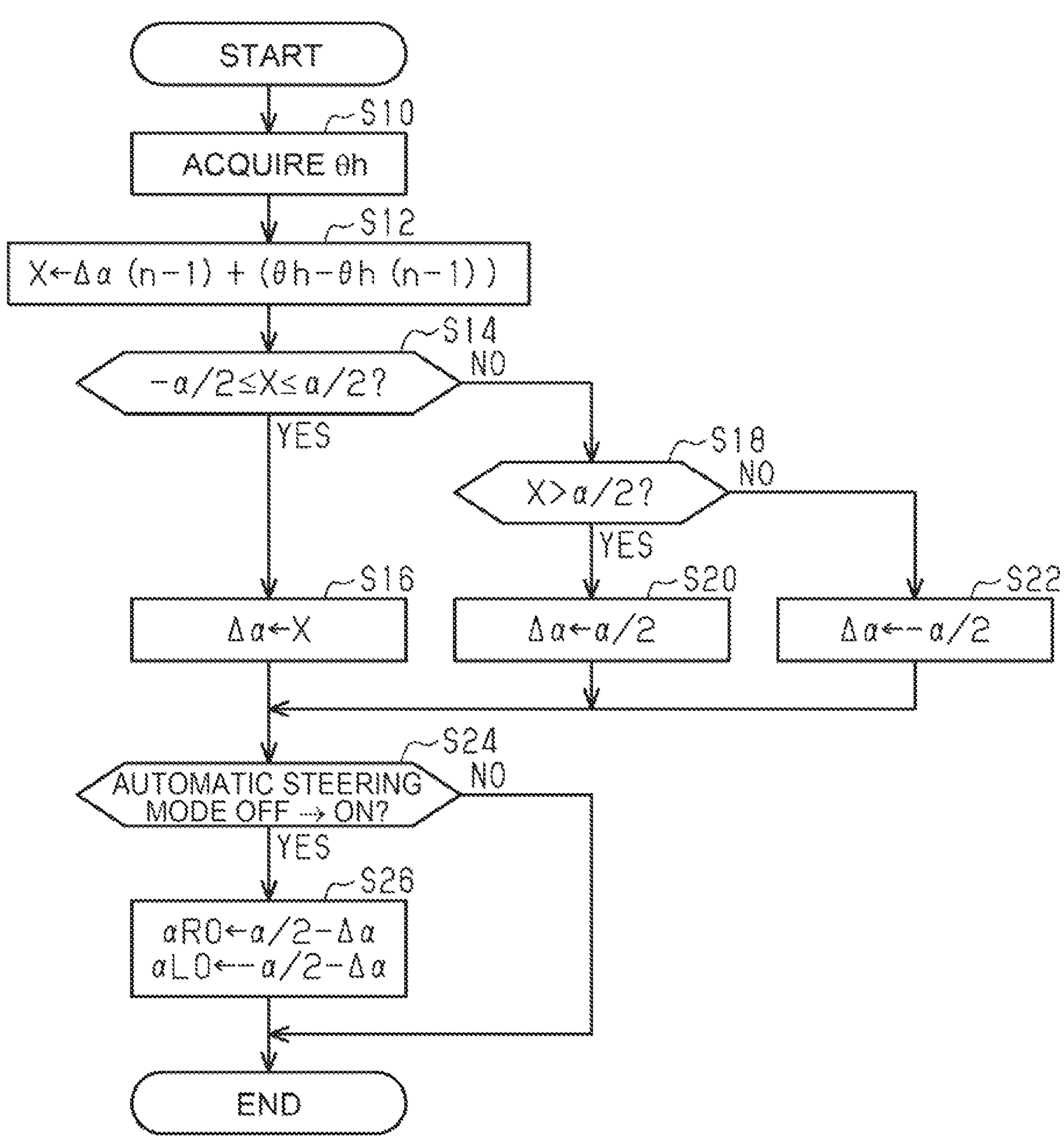
FIG. 3 is a flowchart showing a procedure of a process that is executed by a control device according to the first embodiment.

FIG. 3 shows a procedure of a process relevant to the setting of the play base amount. The process shown in FIG. 3 is realized when the PU 62 repeatedly executes a program stored in the storage device 64 with a predetermined period, for example. Hereinafter, step numbers for processes are expressed as numerals in which "S" is put to the head.

In a sequence of processes shown in FIG. 3, the PU 62 acquires the steering angle $\theta h$ (S10). The steering angle $\theta h$ is calculated by integration processing of the rotation angle $\theta m$, by the PU 62. Next, the PU 62 calculates a variable X for calculating a play displacement, by the following expression (S12).

$$X \leftarrow \Delta\alpha(n-1)+(\theta h-\theta h(n-1))$$

In the above expression, "n−1" means a value at the last execution timing before the execution timing of the sequence of processes shown in FIG. 3. That is, "$\Delta\alpha$(n−1)" means a play displacement $\Delta\alpha$ at the last execution timing of the sequence of processes shown in FIG. 3. Further, "$\theta h$(n−1)" means a value acquired in the process of S10 at the last execution timing of the sequence of processes shown in FIG. 3.

FIG. 2 exemplifies the play displacement $\Delta\alpha$. FIG. 2 shows a state where the steering angle $\theta h$ has reached the position of the point P because the steering angle $\theta h$ has been changed from the neutral position O to the right by the play displacement $\Delta\alpha$. Back to FIG. 3, the PU 62 determines whether the value of the variable X is equal to or larger than "$-\alpha/2$" and is equal to or smaller than "$\alpha/2$" (S14). In the case where the PU 62 makes the positive determination in the process of S14, the PU 62 substitutes the value of the variable X into the play displacement $\Delta\alpha$ (S16).

On the other hand, in the case where the PU 62 makes the negative determination in the process of S14, the PU 62 determines whether the value of the variable X is larger than "$\alpha/2$" (S18). In the case where the PU 62 determines that the value of the variable X is larger than "$\alpha/2$" (S18: YES), the PU 62 substitutes "$\alpha/2$" into the play displacement $\Delta\alpha$ (S20). This process corresponds to a situation in which the steering angle $\theta h$ has been greatly changed to the right beyond the point A in FIG. 2, for example. In that case, the play displacement $\Delta\alpha$ is positioned at the end portion in the right steering direction of the region where the turning angle $\theta t$ does not change despite the change in the steering angle $\theta h$. When the length of the region is "$\alpha$" and the center of the region is defined as "0", the play displacement $\Delta\alpha$ at the end portion in the right steering direction of the above region is "$\alpha/2$".

On the other hand, in the case where the PU 62 makes the negative determination in the process of S18, the PU 62 substitutes "$-\alpha/2$" into the play displacement $\Delta\alpha$ (S22). The processes of S10 to S22 are an example of the play displacement calculation process in the present disclosure.

In the case where the PU 62 completes the processes of S16, S20, and S22, the PU 62 determines whether the switching to an automatic steering mode has been performed (S24). The automatic steering mode is a mode in which the above automatic steering process is executed. In the automatic steering mode, the higher-level ECU 80 outputs a target angle $\theta t^*$ to the steering control device 60. The target angle $\theta t^*$ is a variable that indicates the target value of the turning angle of the turning wheel 40. The change amount of the target angle $\theta t^*$ is quantified so as to be equal to the change amount of the steering angle $\theta h$ between the point F and the point B or between the point C and the point E shown in FIG. 2.

In the case where the PU 62 determines that the switching has been performed (S24: YES), the PU 62 sets a right play base amount $\alpha R0$ and a left play base amount $\alpha L0$ (S26). That is, the PU 62 substitutes "$\alpha/2-\Delta\alpha$" into the right play base amount $\alpha R0$. Further, the PU 62 substitutes "$-\Delta/2--\Delta\alpha$" into the left play base amount $\alpha L0$. The process of S24 and the process of S26 are an example of the base amount setting process.

For example, in the case where the play displacement $\Delta\alpha$ is positioned at the point P shown in FIG. 2 at the time when the switching to the automatic steering mode has been performed, the turning angle does not change until the steering angle $\theta h$ changes by "$\alpha/2-\Delta\alpha$", even when the target angle $\theta t^*$ is changed in the right steering direction. Therefore, for enhancing the responsiveness of the turning angle with respect to the change in the target angle $\theta t^*$, it is desirable to correct the target angle $\theta t^*$ by "$\alpha/2-\Delta\alpha$", by an open-loop control, with the change in the target angle $\theta t^*$ in the right steering direction. Therefore, the PU 62 substitutes "$\alpha/2-\Delta\alpha$" into the right play base amount $\alpha R0$. Further, in the case where the play displacement $\Delta\alpha$ is positioned at the point P, the turning angle does not change until the steering angle $\theta h$ changes by "$-\Delta/2-\Delta\alpha$", even when the target angle $\theta t^*$ is changed in the left steering direction. Therefore, for enhancing the responsiveness of the turning angle with respect to the change in the target angle $\theta t^*$, it is desirable to correct the target angle $\theta t^*$ by "$-\Delta/2-\Delta\alpha$", by the open-loop control, with the change in the target angle $\theta t^*$ in the left steering direction. Therefore, the PU 62 substitutes "$-\Delta/2-\Delta\alpha$" into the left play base amount $\alpha L0$.

In the case where the PU 62 completes the process of S26 or makes the negative determination in the process of S24, the PU 62 ends the sequence of processes shown in FIG. 3 once.

Control of Turning Angle in Automatic Steering Mode

Figure 4:
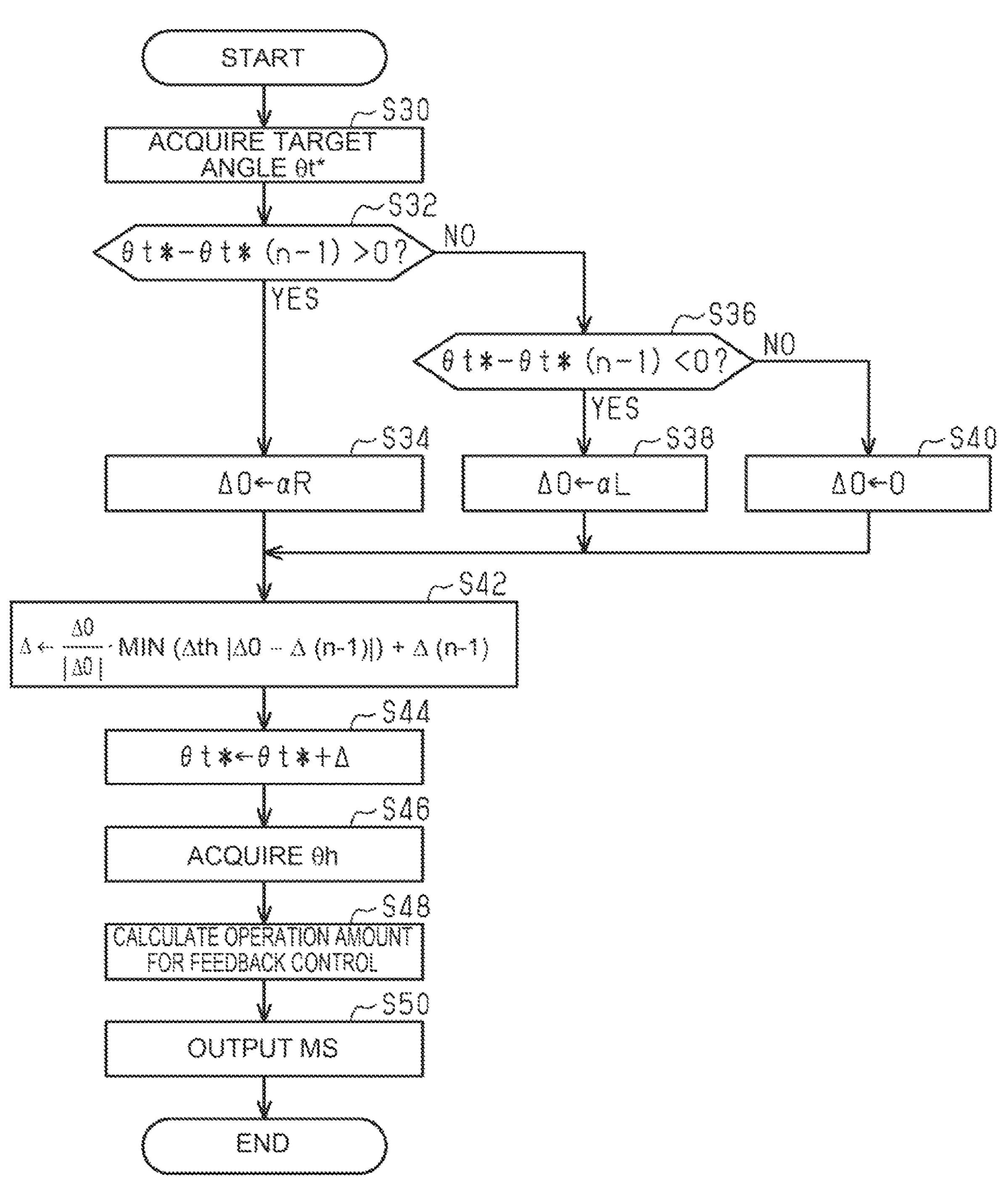
FIG. 4 is a flowchart showing a procedure of a process that is executed by the control device according to the first embodiment.

FIG. 4 shows a procedure of a process relevant to the control of the turning angle. The process shown in FIG. 4 is realized when the PU 62 repeatedly executes a program stored in the storage device 64 with a predetermined period in the automatic steering mode, for example.

In a sequence of processes shown in FIG. 4, first, the PU 62 acquires the target angle $\theta t^*$ that is output by the higher-level ECU 80 (S30). Next, the PU 62 determines whether the change in the target angle $\theta t^*$ is positive (S32). In other words, the PU 62 determines whether the change direction of the target angle $\theta t^*$ is the right steering direction. In the case where the change direction of the target angle $\theta t^*$ is the right steering direction, the instruction from the higher-level ECU 80 through the target angle $\theta t^*$ is the right steering. In FIG. 4, the target angle $\theta t^*$ acquired by the process of S30 at the previous execution timing of the sequence of processes in FIG. 4 is described as "$\theta t^*(n-1)$". The process of S30 is an example of the target rudder angle variable acquisition process in the present disclosure.

In the case where the PU 62 determines that the change in the target angle $\theta t^*$ is positive (S32: YES), the PU 62 substitutes the right play compensation amount $\alpha R$ into a play compensation amount $\Delta 0$ (S34). The right play compensation amount $\alpha R$ is set depending on the right play base amount $\alpha R0$, by a later-described process.

On the other hand, in the case where the PU 62 makes the negative determination in the process of S32, the PU 62 determines whether the change in the target angle $\theta t^*$ is negative (S36). In other words, the PU 62 determines whether the change direction in the target angle $\theta t^*$ is the left steering direction. In the case where the PU 62 determines that the change in the target angle $\theta t^*$ is negative (S36: YES), the PU 62 substitutes the left play compensation amount $\alpha L$ into the play compensation amount $\Delta 0$ (S38). The left play compensation amount $\alpha L$ is set depending on the left play base amount $\alpha L0$, by the later-described process.

In the case where the PU 62 makes the negative determination in the process of S36, the PU 62 substitutes "0" into the play compensation amount $\Delta 0$ (S40).

In the case where the PU 62 completes the process of S34, S38, or S40, the PU 62 performs a guard process of restricting the magnitude of the change speed of the play compensation amount $\Delta 0$ to a small side (S42). The value after the guard process is a play compensation amount $\Delta$. When the play compensation amount $\Delta$ at the last execution timing of the sequence of processes shown in FIG. 4 is "$\Delta(n-1)$", the output of the process of S42 is shown as follows.

$$(\Delta 0/|\Delta 0|)\cdot \mathrm{MIN}(\Delta th|\Delta 0-\Delta(n-1)|)+\Delta(n-1)$$

An upper limit $\Delta th$ specifies the maximum of the magnitude of the change amount of the play compensation amount $\Delta$ in the execution period of the processes shown in FIG. 4.

Next, the PU 62 substitutes a value resulting from adding the play compensation amount $\Delta$ to the target angle $\theta t^*$, into the target angle $\theta t^*$ (S44). Next, the PU 62 acquires the steering angle $\theta h$ (S46). Then, the PU 62 calculates an operation amount for a feedback control in which the steering angle $\theta h$ is adopted as a control amount and the target angle $\theta t^*$ is adopted as the target variable of the control amount (S48). The operation amount may be the torque of the motor 50. Next, for controlling the motor 50 depending on the operation amount, the PU 62 outputs an operation signal MS to the inverter 52 (S50). Thereby, for example, in the case where the operation amount is the torque of the motor 50, the output voltage of the inverter 52 is operated such that the torque of the motor 50 becomes the operation amount. This process may be executed while the electric currents iu, iv, iw are adopted as inputs, for example. The process of S44 is an example of the target rudder angle correction process in the present disclosure. The process of S48 and the process of S50 are an example of the rudder angle control process in the present disclosure.

In the case where the PU 62 completes the process of S50, the PU 62 ends the sequence of processes shown in FIG. 4 once. In a period during which the processes of S30 to S40 are executed, the processes of S42 to S50 may be executed multiple times. In that case, the play compensation amount $\Delta$ at the last execution timing of the process of S42 is "$\Delta(n-1)$". Thereby, it is possible to more surely cause the play compensation amount $\Delta$ to converge on the play compensation amount $\Delta 0$ before the stop of the change in the target angle $\theta t^*$.

Setting of Play Compensation Amount

Figure 5:
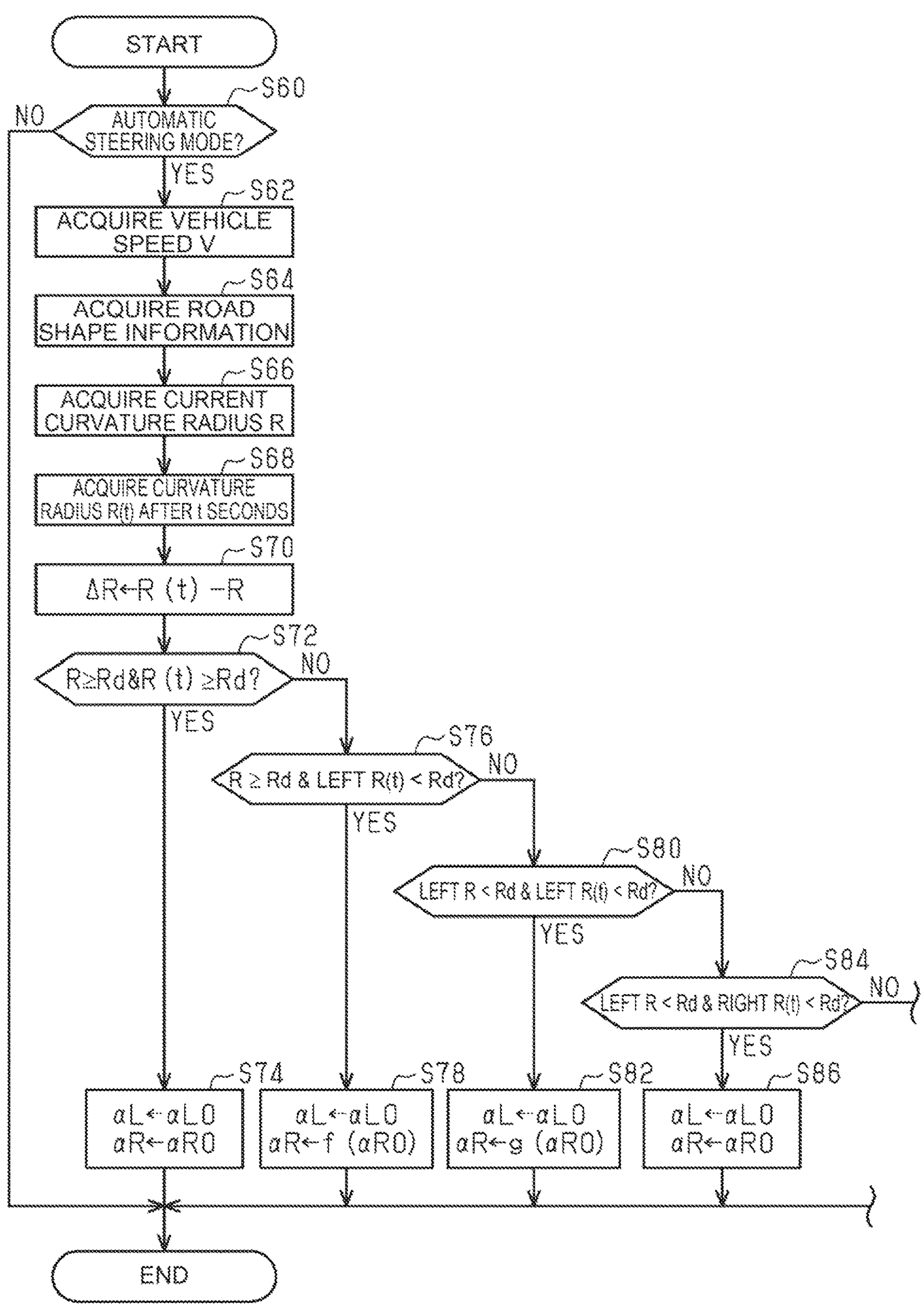
FIG. 5 is a flowchart showing a procedure of a process that is executed by the control device according to the first embodiment.

FIG. 5 shows a procedure of a process relevant to the setting of the right play compensation amount $\alpha R$ and the left play compensation amount $\alpha L$. The process shown in FIG. 5 is realized when the PU 62 repeatedly executes a program stored in the storage device 64 with a predetermined period, for example.

In a sequence of processes shown in FIG. 5, first, the PU 62 determines whether the automatic steering mode is being executed (S60). In the case where the PU 62 determines that the automatic steering mode is being executed (S60: YES), the PU 62 acquires the vehicle speed V (S62). Next, the PU 62 acquires road shape information from the higher-level ECU 80 (S64). The road shape information is information relevant to the lane that is extracted by the higher-level ECU 80 from the image photographed by the camera 82. Next, the PU 62 acquires a curvature radius R of the lane on which the vehicle is currently traveling (S66). The curvature radius R is calculated by the PU 62, using traveling route information. Further, the PU 62 acquires a curvature radius R(t) of the lane at a point at which the vehicle will arrive after t seconds (S68). The curvature radius R(t) after t seconds is calculated by the PU 62, using the traveling route information and the vehicle speed V. That is, the point at which the vehicle will arrive after t seconds is a point that is predicted based on the vehicle speed V. Further, the PU 62 acquires a curvature radius change rate $\Delta R$ (S70). The PU 62 acquires the curvature radius change rate $\Delta R$ by executing a process of substituting a value resulting from subtracting the curvature radius R from the curvature radius R(t) after t seconds into the curvature radius change rate $\Delta R$. The process of S64 is an example of the traveling route information acquisition process in the present disclosure.

Next, the PU 62 determines whether the logical product of the following condition (A) and condition (B) is true (S72).

Condition (A) is a condition that the curvature radius R is equal to or larger than a straight-movement threshold Rd. The straight-movement threshold Rd is set based on the lower limit of the curvature radius when the road shape is a straight line or a gentle curve shape similar to a straight line.

Condition (B) is a condition that the curvature radius R(t) after t seconds is equal to or larger than the straight-movement threshold Rd.

In the case where the PU 62 determines that the logical product is true (S72: YES), the PU 62 substitutes the left play base amount $\alpha L0$ into the left play compensation amount $\alpha L$, and substitutes the right play base amount $\alpha R0$ into the right play compensation amount $\alpha R$ (S74). This process is a process for setting the play compensation amount $\Delta 0$ in the processes of S34 and S38 in FIG. 4 to the right play base amount $\alpha R0$ or the left play base amount $\alpha L0$.

On the other hand, in the case where the PU 62 determines the logical product of condition (A) and condition (B) is false (S72: NO), the PU 62 determines whether the logical product of condition (A) and condition (C) is true.

Condition (C) is a condition that the traveling route after t seconds is a left turn route on which the curvature radius R(t) is smaller than the straight-movement threshold Rd.

In the case where the PU 62 determines that the logical product of condition (A) and condition (C) is true (S76: YES), the PU 62 transitions to the process of S78. In the process of S78, the PU 62 substitutes the left play base amount $\alpha L0$ into the left play compensation amount $\alpha L$, and substitutes the restricted right play base amount $\alpha R0$ into the right play compensation amount $\alpha R$. The process of S78 is an example of the restriction process in the present disclosure.

FIG. 6 shows a process of restricting the right play base amount $\alpha R0$.

As shown in FIG. 6, the PU 62 calculates a correction coefficient K1 depending on the curvature radius R(t) after t seconds. The correction coefficient K1 is "1" in the case where the curvature radius R(t) is large, and is smaller than "1" in the case where the curvature radius R(t) is small. For example, the minimal value of the curvature radius R(t) that causes the correction coefficient K1 to be "1" may be smaller than the straight-movement threshold Rd. Further, for example, the minimal value of the curvature radius R(t) that causes the correction coefficient K1 to be "1" may be equal to the straight-movement threshold Rd. Further, for example, the minimal value of the curvature radius R(t) that causes the correction coefficient K1 to be "1" may be larger than the straight-movement threshold Rd. This process may be a process of performing map computation of the correction coefficient K1 in a state where map data is stored in the storage device 64. The map data is data in which the curvature radius R(t) is adopted as an input variable and the correction coefficient K1 is adopted as an output variable.

The map data is combination data of discrete values of the input variable and values of the output variable that respectively correspond to the values of the input variable. Further, in the map computation, in the case where the value of the input variable coincides with one of the values of the input variable in the map data, a corresponding value of the output variable in the map data may be adopted as the computation result. Further, in the map computation, in the case where the value of the input variable does not coincide with any of the values of the input variable in the map data, a value obtained by the interpolation with a plurality of values of the output variable included in the map data may be adopted as the computation result. Instead of this, in the map computation, in the case where the value of the input variable does not coincide with any of the values of the input variable in the map data, a value of the output variable in the map data that corresponds to a closest value of the plurality of values of the input variable included in the map data may be adopted as the computation result.

Further, the PU 62 calculates a correction coefficient K2 depending on the curvature radius change rate $\Delta R$. In the case where the curvature radius change rate $\Delta R$ is equal to or larger than zero, the PU 62 sets the correction coefficient K2 to "1". On the other hand, in the case where the curvature radius change rate $\Delta R$ is smaller than zero, the PU 62 alters the correction coefficient K2 depending on the curvature radius change rate $\Delta R$. Specifically, the PU 62 sets the correction coefficient K2 when the curvature radius change rate $\Delta R$ is small, to equal to or smaller than the correction coefficient K2 when the curvature radius change rate $\Delta R$ is large. In other words, the correction coefficient K2 when the decrease rate of the curvature radius R is large is set to equal to or smaller than the correction coefficient K2 when the decrease rate of the curvature radius R is small. This process may be a process of performing map computation of the correction coefficient K2 in a state where map data is stored in the storage device 64. The map data is a data in which the curvature radius change rate $\Delta R$ is adopted as an input variable and the correction coefficient K2 is adopted as an output variable.

The PU 62 restricts "$K1 \cdot K2 \cdot \alpha R0$" to equal to or smaller than a threshold $\alpha Rth$. That is, in the case where "$K1 \cdot K2 \cdot \alpha R0$" is larger than the threshold $\alpha Rth$, the PU 62 substitutes the threshold $\alpha Rth$ into the right play compensation amount $\alpha R$.

Back to FIG. 5, in the case where the PU 62 determines that the logical product of condition (A) and condition (C) is false (S76: NO), the PU 62 determines whether the logical product of the following condition (D) and condition (C) is true (S80).

Condition (D) is a condition that the traveling route at the current position is a left turn route on which the curvature radius R is smaller than the straight-movement threshold Rd.

The process of S80 is a process of determining whether the vehicle will continue to travel on a left turn curve from the current time to a time after t seconds. In the case where the PU 62 determines that the logical product of condition (D) and condition (C) is true (S80: YES), the PU 62 transitions to the process of S82. In the process of S82, the PU 62 substitutes the left play base amount $\alpha L0$ into the left play compensation amount $\alpha L$, and substitutes an amount resulting from restricting the magnitude of the right play base amount $\alpha R0$, into the right play compensation amount $\alpha R$. The process of S82 is an example of the restriction process in the present disclosure.

FIG. 7 shows a process of restricting the magnitude of the right play compensation amount $\alpha R$.

As shown in FIG. 7, in the case where the curvature radius change rate $\Delta R$ is equal to or larger than "0", the PU 62 substitutes the right play base amount $\alpha R0$ into the right play compensation amount $\alpha R$. On the other hand, in the case where the curvature radius change rate $\Delta R$ is smaller than "0", the PU 62 restricts the magnitude of the right play compensation amount $\alpha R$ depending on the curvature radius change rate $\Delta R$. That is, the PU 62 sets the magnitude of the right play compensation amount $\alpha R$ when the curvature radius change rate $\Delta R$ is small, to equal to or smaller than the magnitude of the right play compensation amount $\alpha R$ when the curvature radius change rate $\Delta R$ is large. In other words, the PU 62 sets the magnitude of the right play compensation amount $\alpha R$ when the decrease rate of the curvature radius R is large, to equal to or smaller than the magnitude of the right play compensation amount $\alpha R$ when the decrease rate of the curvature radius R is small. For example, this process may be a process in which the PU 62 performs map computation of the right play compensation amount $\alpha R$ in a state where map data is stored in the storage device 64. For example, the map data may be data in which the curvature radius change rate $\Delta R$ and the right play base amount $\alpha R0$ are adopted as input variables and the right play compensation amount $\alpha R$ is adopted as an output variable.

Back to FIG. 5, in the case where the PU 62 determines that the logical product of condition (D) and condition (C) is false (S80: NO), the PU 62 determines whether the logical product of condition (D) and the following condition (E) is true (S84).

Condition (E) is a condition that the traveling route after t seconds is a right turn route on which the curvature radius R is smaller than the straight-movement threshold Rd.

In the case where the PU 62 determines that the logical product of condition (D) and condition (E) is true (S84: YES), the PU 62 executes the same process as the process of S74, in the process of S86.

On the other hand, in the case where the PU 62 determines that the logical product of condition (D) and condition (E) is false (S84: NO), the PU 62 executes processes in which "left" is replaced with "right" and "right" is replaced with "left" in the processes of S76 to S86. In FIG. 5, the description about these processes is omitted because of space limitation.

In the case where the PU 62 completes the process of S74, S78, S82, or S86 or makes the negative determination in the process of S60, the PU 62 ends the sequence of processes shown in FIG. 5 once.

Operation and Effect of Embodiment

The PU 62 sets the right play base amount $\alpha R0$ and the left play base amount $\alpha L0$ at the time of the switching to the automatic steering mode. Then, when the target angle $\theta t^*$ is changed in the right steering direction, the target angle $\theta t^*$ is corrected depending on the right play compensation amount $\alpha R$ depending on the right play base amount $\alpha R0$. Further, when the target angle $\theta t^*$ is changed in the left steering direction, the target angle $\theta t^*$ is corrected depending on the left play compensation amount $\alpha L$ depending on the left play base amount $\alpha L0$. When the right play compensation amount $\alpha R$ is the right play base amount $\alpha R0$ and the left play compensation amount $\alpha L$ is the left play base amount $\alpha L0$, it is possible to accurately control the turning angle depending on the target angle $\theta t^*$ by controlling the steering angle $\theta h$ to the target angle $\theta t^*$.

For example, in the case where the target angle $\theta t^*$ is corrected by the right play base amount $\alpha R0$ when the steering direction is slightly changed in the right direction while the vehicle is traveling on a straight route, and thereafter the vehicle travels on a road having a left turn curve shape, there is fear that the controllability for the traveling along the lane decreases. Further, there is fear that the driver has a feeling of strangeness about a large rotation amount of the steering wheel 12.

Hence, the PU 62 restricts the magnitude of the play compensation amount $\Delta 0$ to a small side, depending on the current curvature radius R of the traveling route and the curvature radius R(t) after t seconds. Thereby, it is possible to enhance the trackability to the lane, even when the vehicle travels on the lane having a curve shape after t seconds. Further, it is possible to restrain the rotation amount of the steering wheel 12 from becoming excessively large, when the vehicle is turned along the lane after t seconds.

Second Embodiment

For a second embodiment, differences from the first embodiment will be mainly described below with reference to the drawings.

Figure 8:
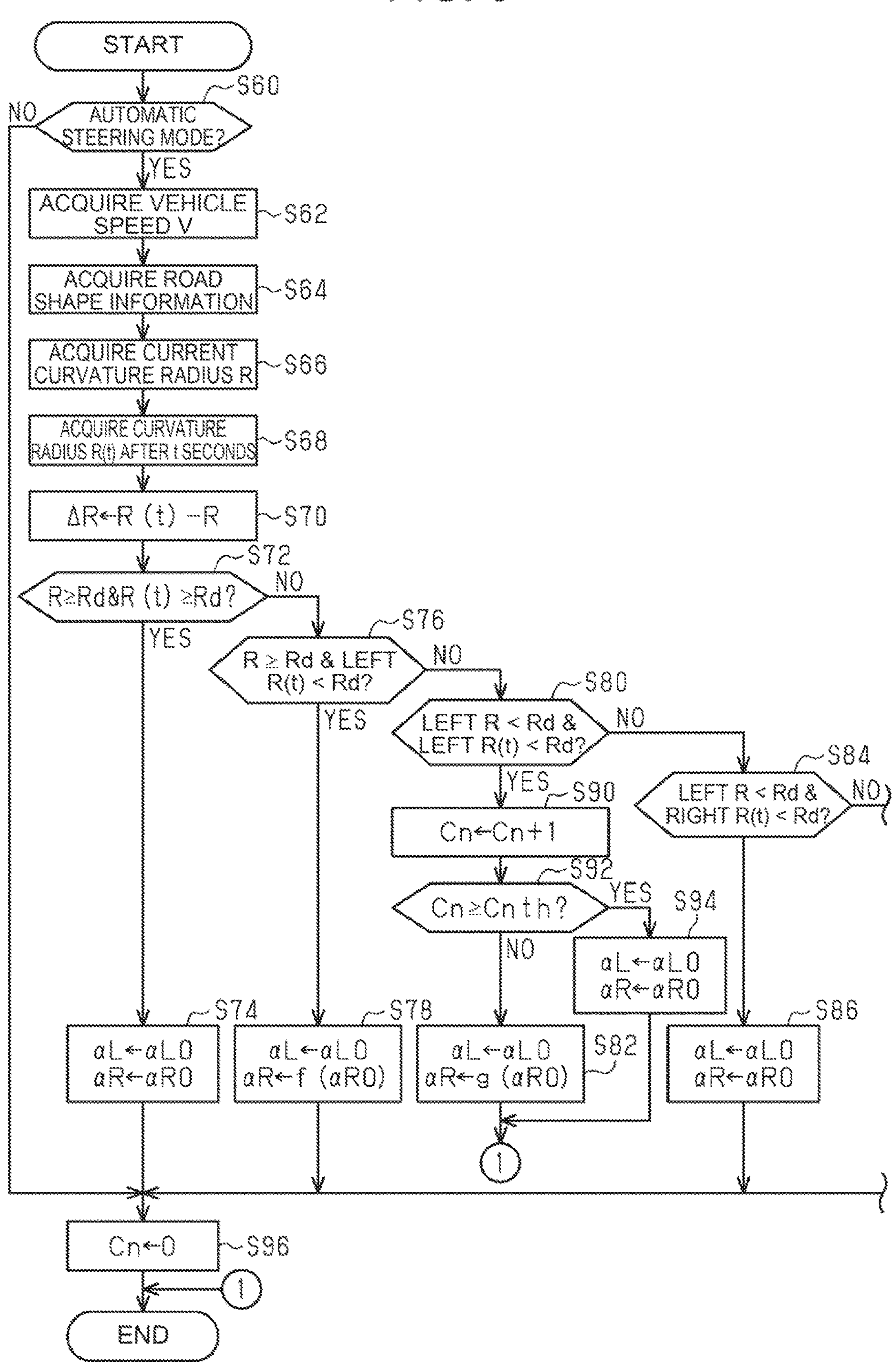
FIG. 8 is a flowchart showing a procedure of a process that is executed by a control device according to a second embodiment.

FIG. 8 shows a procedure of a process relevant to the setting of the right play compensation amount $\alpha R$ and the left play compensation amount $\alpha L$ according to the embodiment. The process shown in FIG. 8 is realized when the PU 62 repeatedly executes a program stored in the storage device 64 with a predetermined period, for example. In the process shown in FIG. 8, for convenience, identical step numbers are given to the same processes as processes shown in FIG. 5.

In a sequence of processes shown in FIG. 8, in the case where the PU 62 makes the positive determination in the process of S80, the PU 62 increments a counter Cn (S90). The counter Cn is used for measuring the continuous time of the process of S80. The PU 62 determines whether the counter Cn is equal to or larger than a threshold Cnth (S92). This process is a process of determining whether the steering in the right direction is appropriate for the lane control of the vehicle. In the case where the PU 62 determines that the counter Cn is smaller than the threshold Cnth (S92: NO), the PU 62 transitions to the process of S82. On the other hand, in the case where the PU 62 determines that the counter Cn is equal to or larger than the threshold Cnth (S92: YES), the PU 62 transitions to the process of S94. In the process of S94, the PU 62 substitutes the left play base amount $\alpha L0$ into the left play compensation amount $\alpha L$, and substitutes the right play base amount $\alpha R0$ into the right play compensation amount $\alpha R$.

In addition, the PU 62 executes processes in which "right" is replaced with "left" and "left" is replaced with "right" in the processes of S80, S82, S90, S92, and S94. Then, in the case where the PU 62 completes the processes of S82 and S94 and processes that correspond to the processes of S82 and S94 and in which the above replacement is performed, the PU 62 ends the sequence of processes shown in FIG. 8 once. In the case where the PU 62 has executed the process of S74 and the processes of S78 and S86 and processes in which the above replacement is performed in the process of S74 and the processes of S78 and S86, the PU 62 initializes the counter Cn (S96). Then, the PU 62 ends the sequence of processes shown in FIG. 8 once.

In this way, in the embodiment, in the case where the steering in the same direction of the current turn direction is continued, the restriction is canceled. Thereby, it is possible to respect the intention for the steering.

Other Embodiments

The embodiments can be carried out while being modified as follows. The embodiments and the following modifications can be carried out while being combined with each other, as long as there is no technical inconsistency.

Traveling Route Information Acquisition Process

In the above embodiments, the PU 62 receives the road shape information from the higher-level ECU 80, and thereafter acquires the current curvature radius R and the curvature radius R(t) after t seconds based on the road shape information, but the applicable embodiment is not limited to this. For example, the PU 62 may acquire the current curvature radius R and the curvature radius R(t) after t seconds, by receiving the current curvature radius R and the curvature radius R(t) after t seconds from the higher-level ECU 80.

Target Rudder Angle Variable

The target rudder angle variable is not limited to the value resulting from converting the turning angle of the turning wheel 40 into the rotation angle of the steering shaft 14. For example, the turning angle itself may be adopted. In that case, in the process of S48, a process in which the value resulting from converting the steering angle $\theta h$ into the turning angle is adopted as the control amount and the target angle is adopted as the target value of the control amount may be executed.

Restriction Process (a) Process about Forward Turn Route on which Curvature Radius R is Equal to or Larger than Straight-Movement Threshold Rd and Curvature Radius R(t) is Smaller than Straight-Movement Threshold Rd The applicable embodiment is not limited to the process of restricting the magnitudes of the right play compensation amount $\alpha R$ and the left play compensation amount $\alpha L$ by the process exemplified in FIG. 6. For example, map data having three-dimensional input variables may be used. That is, for example, the map computation of the right play compensation amount $\alpha R$ may be executed using map data in which the right play base amount $\alpha R0$, the curvature radius R(t), and the curvature radius change rate $\Delta R$ are adopted as input variables and the right play compensation amount $\alpha R$ is adopted as an output variable.

The restriction does not need to be performed depending on the three input variables. For example, it is allowable to adopt a configuration in which the curvature radius R(t) is adopted as an input variable for processing the restriction and the curvature radius change rate $\Delta R$ is not adopted as an input variable for processing the restriction. Further, for example, it is allowable to adopt a configuration in which the curvature radius change rate $\Delta R$ is adopted as an input variable for processing the restriction and the curvature radius R(t) is not adopted as an input variable for processing the restriction.

(b) Process about Continuous Turn Route on which Curvature Radius R is Smaller than Straight-Movement Threshold Rd and Curvature Radius R(t) is Smaller than Straight-Movement Threshold Rd In FIG. 7, in the case where the curvature radius change rate $\Delta R$ is equal to or larger than "0", the right play compensation amount $\alpha R$ is adopted as the right play base amount $\alpha R0$, but the applicable embodiment is not limited to this. Even when the curvature radius change rate $\Delta R$ is equal to or larger than "0", the right play compensation amount $\alpha R$ may be restricted to a smaller value than the right play base amount $\alpha R0$.

The applicable embodiment is not limited to the process of restricting the magnitudes of the right play compensation amount $\alpha R$ and the left play compensation amount $\alpha L$ by the process exemplified in FIG. 7. For example, a process including a process of computing a correction coefficient K3 depending on the curvature radius change rate $\Delta R$ may be performed. That is, for example, the PU 62 may substitute a value resulting from multiplying the right play base amount $\alpha R0$ by the correction coefficient K3, into the right play compensation amount $\alpha R$. Further, for example, the PU 62 may substitute a value resulting from performing a predetermined guard process to the value resulting from multiplying the right play base amount $\alpha R0$ by the correction coefficient K3, into the right play compensation amount $\alpha R$. For example, the guard process may be a process of restricting the magnitude of the value resulting from multiplying the right play base amount $\alpha R0$ by the correction coefficient K3, to equal to or smaller than a predetermined value.

For example, the curvature radius R may be further included in the input for the process of the restriction. That is, for example, the right play compensation amount $\alpha R$ may be calculated depending on the right play base amount $\alpha R0$, the curvature radius R(t), and the curvature radius change rate $\Delta R$.

For example, in the process of S82 and the like, it is not necessary to refer to the curvature radius change rate $\Delta R$ and the curvature radius R(t). That is, for example, a process of restricting the magnitude of the right play compensation amount $\alpha R$ to equal to or smaller than a predetermined value may be performed.

(c) Others

For example, in the case where the play compensation amount $\Delta$ does not reach the play compensation amount $\Delta 0$ at the time when the change in the target angle $\theta t^*$ is stopped, the play compensation amount $\Delta$ may be changed until the play compensation amount $\Delta$ reaches the play compensation amount $\Delta 0$. This means that the play compensation amount $\Delta$ is changed to the right play compensation amount $\alpha R$ in the case where the target angle $\theta t^*$ transitions from the state of the change in the right steering direction to the state of the stop of the change, for example.

In the process of S42, the change amount of the play compensation amount $\Delta$ is restricted to equal to or smaller than the upper limit $\Delta th$, which is a constant, but the applicable embodiment is not limited to this. For example, the upper limit $\Delta th$ may be altered depending on the change speed of the target angle $\theta t^*$. In that case, for example, the PU 62 may set the upper limit $\Delta th$ when the magnitude of the change speed is large, to equal to or larger than the upper limit $\Delta th$ when the magnitude of the change speed is small.

The restriction of the magnitude of the change amount of the play compensation amount $\Delta$ is not essential. For example, the play compensation amount $\Delta$ may be set to an amount that is one of the three values: the right play compensation amount $\alpha R$, the left play compensation amount $\alpha L$, and zero.

Automatic Steering Mode

In the above embodiments, a process in which the higher-level ECU 80 executes the steering in a state where the steering wheel 12 is not operated by the driver is assumed. However, the automatic steering process that is executed in the automatic steering mode is not limited to such a process. For example, the automatic steering process that is executed in the automatic steering mode may be a process in which the higher-level ECU 80 intervenes in the steering in the case where the vehicle is about to depart from the lane when the driver is operating the steering wheel 12. Further, for example, the automatic steering process that is executed in the automatic steering mode may be a process in which the higher-level ECU 80 intervenes in the steering in the case where the vehicle is about to make contact with an obstacle when the drive is operating the steering wheel 12.

Rudder Angle Control Process

The rudder angle control process does not need to include the process of calculating the operation amount for the feedback control in which the steering angle $\theta h$ is adopted as the control amount and the target angle $\theta t^*$ is adopted as the target value of the control amount. For example, a process of calculating an operation amount for an open-loop control in which the steering angle $\theta h$ is adopted as a control amount and the target angle $\theta t^*$ is adopted as the target value of the control amount may be included. Further, for example, a process of calculating both of the operation amount for the feedback control and the operation amount for the open-loop control may be included.

Steering Control Device

The steering control device is not limited to the device that acquires the target angle $\theta t^*$ set by the higher-level ECU 80. For example, a device in which the steering control device 60 and the higher-level ECU 80 are integrated may be adopted.

The steering control device 60 is not limited to the device that includes the PU 62 and the storage device 64 and that executes software processing. For example, at least some of the processes that are executed by software processing in the above embodiments may be executed by a dedicated hardware circuit (for example, an ASIC) that performs hardware processing. That is, the steering control device may have one configuration of the following (a) to (c). (a) A processing device that executes all of the above processes in accordance with programs and a program storage device that stores the programs, as exemplified by a ROM, are included. (b) A processing device that executes some of the above processes in accordance with programs, a program storage device, and a dedicated hardware circuit that executes the remaining processes are included. (c) A dedicated hardware circuit that executes all of the above processes is included. A plurality of software processing circuits each of which includes a processing device and a program storage device, or a plurality of dedicated hardware circuits may be provided. That is, the above process may be executed by a processing circuit that includes at least one of a single or a plurality of software processing circuits and a single or a plurality of dedicated hardware circuits.

What is claimed is:

1. A steering control device configured to control a steering device, the steering device including a steering shaft, a turning wheel of a vehicle, the turning wheel being configured to turn along with rotation of the steering shaft, and a motor configured to rotate the steering shaft, the steering control device comprising a processor configured to execute:

a target rudder angle variable acquisition process of acquiring a value of a target rudder angle variable, the target rudder angle variable being a variable that indicates a target value of a turning angle of the turning wheel;

a traveling route information acquisition process of acquiring information about a traveling route of the vehicle;

a target rudder angle correction process of correcting the value of the target rudder angle variable by a play compensation amount corresponding to a steering direction, the steering direction being a direction in which the value of the target rudder angle variable changes;

a restriction process of restricting a magnitude of the play compensation amount to a small side depending on the traveling route at a current position of the vehicle and the traveling route at a movement-directional forward position; and a rudder angle control process of operating the motor by a control in which a steering angle depending on a rotation angle of the steering shaft is adopted as a control amount and the value of the target rudder angle variable is adopted as a target value of the control amount.

2. The steering control device according to claim 1, wherein the restriction process includes a process of restricting, on a forward turn route, the magnitude of the play compensation amount corresponding to the steering direction that is an opposite direction of a turn direction at the movement-directional forward position, to a smaller value, compared to when both of a curvature radius of the traveling route at the current position and a curvature radius of the traveling route at the movement-directional forward position are equal to or larger than a straight-movement threshold, the forward turn route being a route on which the curvature radius of the traveling route at the current position is equal to or larger than the straight-movement threshold and the curvature radius of the traveling route at the movement-directional forward position is smaller than the straight-movement threshold.

3. The steering control device according to claim 2, wherein the restriction process includes a process of altering, on the forward turn route, the magnitude of the play compensation amount corresponding to the steering direction that is the opposite direction of the turn direction at the movement-directional forward position, depending on the curvature radius of the traveling route at the movement-directional forward position, and setting the magnitude of the play compensation amount when the curvature radius of the traveling route at the movement-directional forward position is small, to equal to or smaller than the magnitude of the play compensation amount when the curvature radius of the traveling route at the movement-directional forward position is large.

4. The steering control device according to claim 2, wherein the restriction process includes a process of altering, on the forward turn route, the magnitude of the play compensation amount corresponding to the steering direction that is the opposite direction of the turn direction at the movement-directional forward position, depending on a decrease rate of the curvature radius of the traveling route at the movement-directional forward position, and setting the magnitude of the play compensation amount when the decrease rate is large to equal to or smaller than the magnitude of the play compensation amount when the decrease rate is small.

5. The steering control device according to claim 2, wherein:

the processor is configured to execute the rudder angle control process in an automatic steering mode, a play displacement calculation process of calculating a play displacement each time the steering angle changes, the play displacement being an amount that identifies a position in a region where the turning angle does not change even when the steering angle changes, and a base amount setting process of setting a play base amount corresponding to a right steering direction and a play base amount corresponding to a left steering direction, to quantities that allow the steering angle to be maintained within the region, depending on the play displacement at a time when the automatic steering mode is achieved; and the restriction process includes a process of restricting, on the forward turn route, the magnitude of the play compensation amount corresponding to the steering direction that is the opposite direction of the turn direction at the movement-directional forward position, to a smaller value than a magnitude of the play base amount, when the magnitude of the play base amount is equal to or larger than a predetermined value.

6. The steering control device according to claim 1, wherein the restriction process includes a process of restricting, on a continuous turn route, the magnitude of the play compensation amount corresponding to the steering direction that is an opposite direction of a turn direction at the movement-directional forward position, to a smaller value, compared to when both of a curvature radius of the traveling route at the current position and a curvature radius of the traveling route at the movement-directional forward position are equal to or larger than a straight-movement threshold, the continuous turn route being a route on which the curvature radius of the traveling route at the current position is smaller than the straight-movement threshold and the curvature radius of the traveling route at the movement-directional forward position is smaller than the straight-movement threshold.

7. The steering control device according to claim 6, wherein:

the process of restricting, on the continuous turn route, the magnitude of the play compensation amount corresponding to the steering direction that is the opposite direction of the turn direction at the movement-directional forward position, to the smaller value, compared to when both of the curvature radius of the traveling route at the current position and the curvature radius of the traveling route at the movement-directional forward position are equal to or larger than the straight-movement threshold is a process that is executed when a turn direction of the traveling route at the current position and the turn direction of the traveling route at the movement-directional forward position are the same; and the restriction process includes a process of restricting, on the continuous turn route, the magnitude of the play compensation amount corresponding to the steering direction that is the opposite direction of the turn direction at the movement-directional forward position, to a smaller side, when the turn direction of the traveling route at the current position and the turn direction of the traveling route at the movement-directional forward position are the same, compared to when the turn direction of the traveling route at the current position and the turn direction of the traveling route at the movement-directional forward position are different.

8. The steering control device according to claim 6, wherein the restriction process includes a process of altering, on the continuous turn route, the magnitude of the play compensation amount corresponding to the steering direction that is the opposite direction of the turn direction at the movement-directional forward position, depending on a decrease rate of the curvature radius of the traveling route at the movement-directional forward position, and setting the magnitude of the play compensation amount when the decrease rate is large to equal to or smaller than the magnitude of the play compensation amount when the decrease rate is small.

9. The steering control device according to claim 1, wherein:

the processor is configured to execute the rudder angle control process in an automatic steering mode, a play displacement calculation process of calculating a play displacement each time the steering angle changes, the play displacement being an amount that identifies a position in a region where the turning angle does not change even when the steering angle changes, and a base amount setting process of setting a play base amount corresponding to a right steering direction and a play base amount corresponding to a left steering direction, to quantities that allow the steering angle to be maintained within the region, depending on the play displacement at a time when the automatic steering mode is achieved; and the restriction process is a process of restricting the play compensation amount to a smaller value than the play base amounts.

* * * * *